March 30, 1954     H. H. WITTENBERG     2,673,953
VARIABLE REGULATED IGNITRON RECTIFIER
Filed June 14, 1951
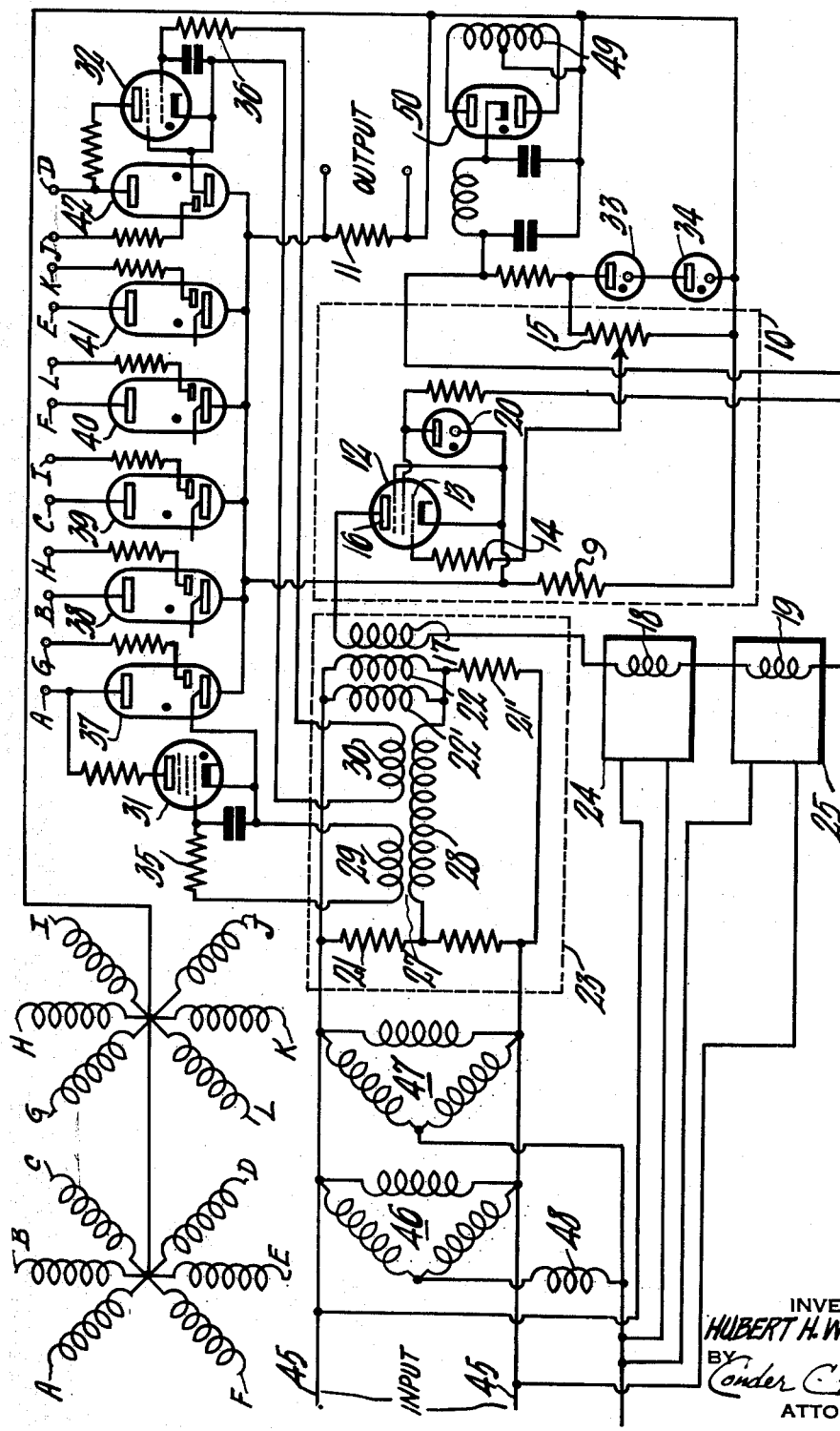
INVENTOR
HUBERT H. WITTENBERG
BY Conder C. Henry
ATTORNEY Patented Mar. 30, 1954

2,673,953

UNITED STATES PATENT OFFICE 2,673,953

VARIABLE REGULATED IGNITRON RECTIFIER

Hubert H. Wittenberg, Lancaster, Pa., assignor to Radio Corporation of America, a corporation of Delaware Application June 14, 1951, Serial No. 231,563

3 Claims. (Cl. 321—18)

My invention relates to electrical control circuits and in particular to circuits for controlling the output voltage of a half-wave rectifier.

It is an object of my invention to provide a control circuit in which output voltages can be obtained at very high currents.

A further object of my invention is to provide a simple and inexpensive means for regulating the direct current output voltage of a half-wave rectifier.

Still another object of my invention is to provide a control circuit in which automatic means are provided to compensate for output voltage variations.

In general, my invention comprises a multi-phase half-wave rectifier in which several ignitrons form the rectifying portion of the circuit. In the example illustrated, I employ six ignitrons to provide a six phase half-wave rectifier in which gaseous discharge tubes of the thyratron type serve to fire the ignitrons. An alternating current voltage from a phase shifting network, in parallel to the direct current output voltage of the circuit, controls the firing tubes in such a way that the voltage applied to a load resistance is set at a predetermined value.

The above objects are accomplished by the structure and arrangement set forth in the following description when taken in connection with the accompanying drawing, in which the single figure illustrates in diagrammatic form a circuit to which such objects are particularly adapted.

Referring to the drawing, a three phase supply of alternating current 45 supplies the delta connected primaries 46, 47, which primaries are connected in parallel. The rectifier portion of the circuit includes, in the illustration shown, six ignitrons indicated by the numerals 37 through 42. The transformer secondaries which are indicated by the letters A through L, provide plate and grid excitation for the ignitron rectifiers. The connections between the transformer secondaries and the ignitrons correspond to the letters as shown on the drawing, the actual connections having been omitted for purposes of clarity.

Current for the alternating current windings 22 and 22' of a saturable reactor, which are in the network contained within the dotted lines 23, is obtained from the three phase alternating current input source 45. Also in the network 23 the primary winding 28 of a transformer 27 is connected as a bridge between the center tap of resistor 21 and the junction of the alternating current windings 22 and 22', and a fixed resistor 21'. The secondary windings of the transformer 27 are indicated by the numerals 29 and 30, such transformer being used to feed the identical firing tubes 31 and 32, containing a plate, a cathode, and a control grid, in push-pull fashion through resistors 35 and 36. In the example illustrated, electronic tubes 31 and 32 are of the thyratron type. Two other similar networks, 24 and 25, feed four additional electronic tubes identical to tubes 31 and 32, previously described. These tubes have also been omitted for purposes of clarity. In this connection, it should be stated that the box diagrams designated by the numerals 24 and 25 are schematic representations of networks identical to the network 23.

Direct current power for the control phase shifting network which is contained within the dotted lines 10 is supplied through the full-wave rectifier 50, which in the example illustrated is of the gaseous discharge type. The single phase alternating current supply for such rectifier is supplied by the secondary winding 49 of a transformer. The primary winding of the transformer designated by the numeral 48 is supplied with current by the input source of the three phase alternating current 45.

The direct current output voltage of the circuit is obtained across the load resistor 11, such load resistor being connected in parallel to the cathode resistor 9 of space discharge device 12. The object of this connection will become apparent when the operation of the phase shifting network is described.

The network 10 is used to control the timing of the firing tubes 31 and 32, and the four additional firing tubes not shown in the drawing. In the circuit arrangement illustrated, the direct current output voltage across the load resistor 11 is set by adjustments made in the voltage potentiometer 15, thereby providing a simple and effective means for controlling and regulating the rectified output voltage from the ignitrons.

As previously described, the cathode resistor 9 of space discharge device 12 is connected in parallel to a load resistor 11. An electronic tube 12 containing at least a plate, a control electrode, and a cathode, is included within the phase shifting network. In the illustration shown, the electronic tube 12 is of the pentode type. The control grid 13 of this tube is connected in series through a resistance 14 to the variable voltage potentiometer 15, so that the current of the plate 16 of such tube can be controlled by varying the resistance of the potentiometer. This, in turn, controls the flow of current in the direct current windings 17, 18 and 19 of saturable reactors which are connected in series with the plate of the tube. As previously described, alternating current windings 22 and 22', corresponding to the direct current winding 17 of one of the saturable reactors, are included in the network indicated generally by the numeral 23.

A tube 20 of the gaseous regulator type maintains a constant potential on the screen of the electronic tube 12. Similarly, other tubes, 33 and 34, also of the gaseous voltage regulator type, maintain a constant voltage across the potentiometer 15.

The grid bias of space discharge device 12 consists of two parts, the fixed voltage drop across potentiometer 15 and the D. C. output voltage across resistor 11 which is connected in parallel with the cathode resistor 9.

The operation of this portion of the circuit is substantially as follows: If it is assumed that there is no output voltage across the load resistance 11, moving the contact of the voltage potentiometer 15 up from the negative end will increase the positive potential on the control grid 13 of the electronic tube 12. Consequently, the plate 16 will draw current. This increase in plate current will increase the current in the direct current winding and thus increase the saturation of the saturable reactor, thereby decreasing the inductance of its alternating current windings. A corresponding shift in the phase angle of the current will accompany this decrease in inductance, shifting the phase of the current in the secondary of the transformer 27. The firing point of the thyratrons 31 and 32, and the other four thyratrons which are not shown will, therefore, be advanced. In this manner, an effective control is established over the firing tubes, which, in turn, control the firing of the ignitrons 37 through 42. In adidtion, since the output voltage across the load resistance 11 is effectively connected in parallel with the variable voltage potentiometer 15, it is obvious that the direct current output voltage will necessarily have to rise to match the preset value on the voltage potentiometer 15. It should be understood that the action of the networks indicated by numerals 24 and 25, which feed the four firing tubes which are not shown, is identical to that just described for the network 23.

As described, the circuit will automatically compensate for output voltage variations due to any cause. A drop or rise in the output voltage will change the phase in the alternating current windings of the saturable reactors and automatically change the output voltage so that it will be equal to the preset value on the voltage potentiometer 15. In addition, current failures in the plate circuit of the electronic tube 12, due to a possible fault in direct current supply, will automatically reduce the phase in the alternating current winding of the saturable reactors, and hence the phase of the ignitrons, thereby decreasing the output voltage. Thus it will be apparent that by my arrangement a circuit is provided in which control means are incorporated for regulating the direct current output voltage at high currents of a half-wave rectifier.

Having thus described my invention, what I claim and desire to secure by Letters Patent is:

1. An electronic voltage control circuit comprising, in combination, output terminals, a rectifier for producing a direct current output voltage across said output terminals, a phase shifting network including a space discharge device having a cathode, a grid and an anode, a cathode resistor connected to said cathode, said cathode resistor being connected across said output terminals, said grid being adapted to be biased at least in part by a regulated direct current voltage, a saturable reactor, said anode being connected in series with said saturable reactor and means including said saturable reactor for varying the conductivity of said rectifier, said means being controlled by said phase shifting network.

2. An electronic voltage control circuit comprising, in combination, output terminals, a multi-phase rectifier for producing a direct current output voltage across said output terminals, a phase shifting network including an electronic space discharge device having a cathode, a grid and an anode, a cathode resistor connected to said cathode, said cathode resistor being connected across said output terminals, said grid connected to a regulated direct current voltage, a plurality of saturable reactors, said anode being connected in series with said plurality of saturable reactors, and means including said plurality of saturable reactors for varying the conductivity of said multi-phase rectifier, said means being controlled by the current flowing through said saturable reactors.

3. An electronic voltage control device comprising in combination, output terminals, a rectifier for producing a direct current output voltage across said output terminals, a phase shifting network including a space discharge device regulated for constant gain having a cathode, a control grid, an anode and an auxiliary grid, said auxiliary grid being biased by a constant voltage, a cathode resistor connected to said cathode, said cathode resistor being connected across said output terminals, said control grid being adapted to be biased at least in part by a regulated direct current voltage, a saturable reactor, said anode being connected in series with said saturable reactor and means including said saturable reactor for varying the conductivity of said rectifier, said means being controlled by said phase shifting network.

HUBERT H. WITTENBERG.

References Cited in the file of this patent

UNITED STATES PATENTS

| Number | Name | Date |
| --- | --- | --- |
| 1,870,022 | Prince | Aug. 2, 1932 |
| 2,083,382 | Jutson et al. | June 8, 1937 |
| 2,095,827 | Moyer | Oct. 12, 1937 |
| 2,196,680 | Milarta | Apr. 9, 1940 |
| 2,315,619 | Hutcheson et al. | Apr. 6, 1943 |
| 2,554,837 | Meszaros | May 29, 1951 |
| 2,567,797 | Anderson | Sept. 11, 1951 |